United States Patent Office 3,065,235
Patented Nov. 20, 1962

3,065,235
7-CHLORO-2-CHLOROMETHYL-6-SULFAMYL-1,2,3,4-TETRAHYDRO-4-QUINAZOLINONE
Elliott Cohen, Mount Vernon, and Betty Klarberg, New York, N.Y., assignors to American Cyanamid Company, New York, N.Y., a corporation of Maine
No Drawing. Filed June 15, 1960, Ser. No. 36,140
1 Claim. (Cl. 260—256.4)

This invention relates to 7-chloro-2-chloro-methyl-6-sulfamyl-1,2,3,4-tetrahydro-4-quinazolinone of the formula:

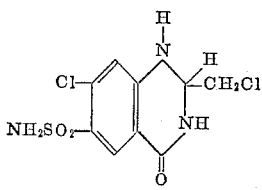

The novel compound of this invention is a useful diuretic and saluretic of low toxicity. The new compound also has greater potency than previously reported quinazolinones. The new compound may be administered orally or parenterally and when so administered has been found to be effective in causing fluid sodium and chloride diuresis in low dosage. For example, in test animals an oral dose of 0.1 mg./kg. has been found to result in a 4-fold increase over the controls in 0–24 hour sodium and chloride excretion.

The new compound is a white crystalline solid, insoluble in water and relatively soluble in lower alkanols, acetone, dimethylformamide and the like.

The novel compound may be prepared by reacting 4-chloro-5-sulfamylanthranilamide with a lower haloalkyl aldehyde or haloalkyl acetal such as chloroacetaldehyde. The reaction is preferably carried out in a solvent such as diethylene glycol dimethyl ether, alkyl ethers, alkoxy alkanols, dioxanes, tetrahydrofurans or lower alkanols. The temperature may range from about 30° to about 130° with optimum results being obtained at 80° C. to 100° C. The product may be isolated from the reaction mixture in any convenient manner and may be purified by recrystallization in a standard manner.

The invention will be described in greater detail in conjunction with the following specific example.

EXAMPLE

*Preparation of 7-Chloro-2-Chloromethyl-6-Sulfamyl-1,2,3,4-Tetrahydro-4-Quinazolinone*

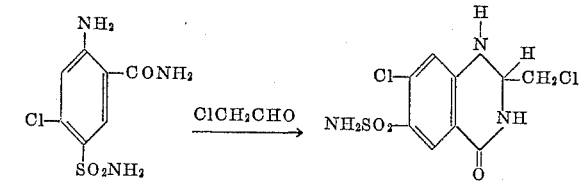

Three grams of 4-chloro-5-sulfamylanthranilamide were dissolved in 400 milliliters of hot ethanol. The solution was concentrated to 300 milliliters and 0.3 milliliter of concentrated hydrochloric acid and 5.0 milliliters of 40% aqueous chloroacetaldehyde were added. After refluxing for four hours, the solution was evaporated to dryness. The solid was dissolved in methanol. Three batches of product were obtained by concentrating the solution. Crude yield: 2.4 g. (65%). A portion (0.30 g.) of the solid was treated with activated charcoal and recrystallized from ethanol, yielding 0.18 g. of white powder, M.P. 225° (eff.).

We claim:

7 - chloro-2-chloromethyl-6-sulfamyl-1,2,3,4-tetrahydro-4-quinazolinone of the formula:

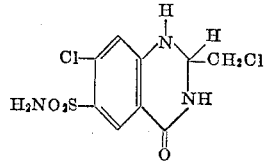

References Cited in the file of this patent
UNITED STATES PATENTS
3,004,024   Bernstein et al. _____ Oct. 10, 1961

OTHER REFERENCES

Smith et al.: "Tetrahedron," volume 1, pp. 38–44 (1957).